United States Patent [19]
Weiss

[11] 4,063,612
[45] Dec. 20, 1977

[54] MOTORIZED GOLF BAG CART

[75] Inventor: Morris Weiss, Pembroke Pines, Fla.

[73] Assignee: Electronics Sports Products, Inc., Dania, Fla.

[21] Appl. No.: 689,037

[22] Filed: May 24, 1976

[51] Int. Cl.² .............................................. B62D 51/04
[52] U.S. Cl. ...................................... 180/195; 180/12
[58] Field of Search ................ 180/19 S, 19 H, 19 R, 180/11, 12, 13, 65 R; 280/DIG. 5

[56] References Cited

U.S. PATENT DOCUMENTS

| | | | |
|---|---|---|---|
| 2,706,008 | 4/1955 | Voigt | 180/19 S |
| 2,937,706 | 5/1960 | Chandler | 180/14 D |
| 2,962,106 | 11/1960 | Burnside | 180/19 H |
| 3,123,173 | 3/1964 | Jacobs | 180/19 S X |
| 3,199,621 | 8/1965 | Seaman | 180/11 |
| 3,225,853 | 12/1965 | Norton | 180/19 H |
| 3,565,199 | 2/1971 | Mistarz | 180/19 H |
| 3,941,198 | 3/1976 | Kappas | 180/19 H X |

*Primary Examiner*—Joseph F. Peters, Jr.
*Assistant Examiner*—Terrance L. Siemens
*Attorney, Agent, or Firm*—Oltman and Flynn

[57] ABSTRACT

This motorized golf bag cart has a wheeled base which carries a battery and a battery-operated motor that drives the front wheels. A handle extends up from the base and is coupled to the base to pivot vertically on the base and to turn the motor and the front wheel axle in the base when the handle is displaced laterally. A rheostat for controlling the motor speed is mounted on the upper end of the handle and it is operated by a squeeze grip there through a mechanical coupling which has substantially no lost motion. This coupling may be a rack and gear or it may be a tensioned chain and gear.

11 Claims, 11 Drawing Figures

MOTORIZED GOLF BAG CART

BACKGROUND OF THE INVENTION

Various battery-operated, motorized carts for golf bags have been proposed heretofore but have not proven to be entirely satisfactory under the various conditions encountered in actual use.

Examples of such prior proposals are shown in the following U.S. patents: Thomas U.S. Pat. No. 2,879,858; Chandler U.S. Pat. No. 2,937,706; Burnside et al U.S. Pat. No. 2,962,106; White U.S. Pat. No. 3,041,085; Beggs U.S. Pat. No. 3,059,713; Racoosin U.S. Pat. No. 3,094,185; Jacobs U.S. Pat. No. 3,123,173; Kaufman U.S. Pat. No. 3,150,736; Norton et al U.S. Pat. No. 3,225,853; and Hollis U.S. Pat. No. 3,719,247.

In the apparatus shown in U.S. Pat. No. 2,962,106 to Burnside et al the handle for the cart is raised or lowered to change the setting of a rheostat on the wheeled base which controls the speed of the drive motor for the cart. Since the handle tends to move up and down when going over bumpy ground, the motor speed may be increased or decreased by such handle movement when the user does not intend it.

Another type of golf bag cart being sold today has the speed control rheostat located in the battery box on the wheeled base of the cart. This inaccessible location means that the speed is set just once, and the setting may be inappropriate for different golfing terrains so that, for example, the preset motor speed may be too low for when the cart has to go uphill or it may be too high for when the cart is going downhill.

Another type of motorized golf bag cart has the speed control rheostat located in the handle in such a position as to make it awkward and inconvenient to change the speed setting.

SUMMARY OF THE INVENTION

The present invention is directed to a novel motorized golf bag cart which substantially overcomes the practical difficulties encountered in the use of previous devices for the same general purpose.

In accordance with one important aspect of this invention, the speed control rheostat for the cart's drive motor is located at the upper end of the handle by which the cart is steered. A squeeze grip at this end of the handle operates the rheostat through a mechanical coupling that is substantially free of lost motion, so that the rheostat setting will correspond immediately and precisely to the amount of squeeze the user is applying to the squeeze grip.

The handle is pivoted to the base of the cart so that up and down movements of the cart over rough ground need not change the horizontal position of the upper end of the handle, which the user will have established to suit his own comfort.

The lower end of the handle also is coupled to the drive motor and the front axle of the cart so that the handle can be used most effectively to steer the cart to the left or right or straight ahead. Preferably, the drive motor is mounted on a platform in the base that can be swiveled about a vertical axis when the handle is moved to the left or right, and this movement of the drive motor is imparted to the front axle through a worm and gear drive.

A principal object of this invention is to provide a novel and improved battery-powered, motor-driven golf bag cart.

Another object of this invention is to provide such a cart which is more practical and reliable in its operation and can be used by a golfer with a minimum of attention and fatigue on his part.

Another object of this invention is to provide such a golf bag cart having a novel speed control arrangement operated by a squeeze grip at the upper end of the handle in such a way that the golfer tends to make the necessary speed adjustments reflexively, and without addressing his conscious attention to it, as he walks over irregular terrain which makes such adjustments desirable.

Another object of this invention is to provide a golf bag cart having such a speed control on the upper end of a handle which is pivoted at its lower end to the wheel-mounted base of the cart, permitting that base to move up and down over rough ground without requiring the user to raise or lower the upper end of the handle.

Further objects and advantages of this invention will be apparent from the following detailed description of two presently-preferred embodiments thereof, which are shown in the accompanying drawings in which:

Before explaining the disclosed embodiments of the present invention in detail, it is to be understood that the invention is not limited in its application to the details of the particular arrangements shown, since the invention is capable of other embodiments. Also, the terminology used herein is for the purpose of description and not of limitation.

EMBODIMENT OF FIGS. 1-7

Referring first to FIGS. 1-4, in this embodiment the present golf bag cart has a wheel-mounted base which is indicated in its entirety by the reference numeral 20. This base is supported by a pair of laterally spaced, ground-engaging, motor-driven front wheels 21 and 22 (FIGS. 3 and 4) mounted on a front axle 23, and by a pair of rear wheels 24 and 25 mounted on a rear axle 26. The base of the cart has a generally bell-shaped housing 27 (FIG. 1), which extends over the top of the front wheels, and a generally horizontal rear shelf 28 joined integrally to the front housing 27 at the latter's lower rear end and extending rearward therefrom between the rear wheels 24 and 25. The rear shelf 28 of the base supports a storage battery 29, which is enclosed by a rear-hinged cover 30.

Figure 5:
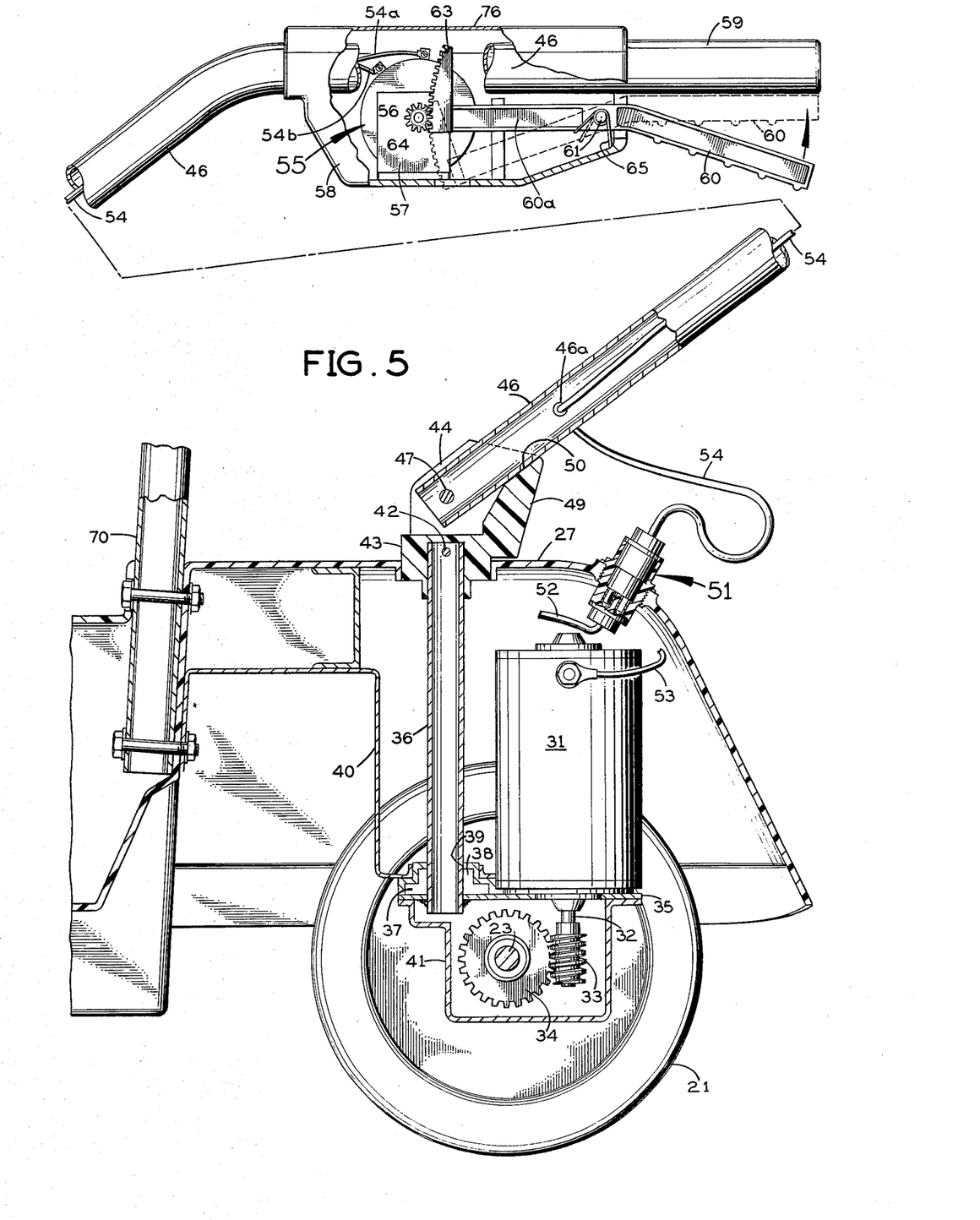
FIG. 5 is a longitudinal section taken along the line 5—5 in FIG. 2, with parts broken away for clarity.

A golf-bag supporting post 70 is bolted or otherwise attached at its lower end to the base 20 (for example, as shown in FIG. 5) about midway along the latter from front to back. This post carries a generally U-shaped cradle 71 (FIG. 1) at its upper end for snugly receiving the golf bag near the latter's upper end. Below this cradle the post 70 presents a downwardly and forwardly inclined segment 70a from which the golf bag has a slight clearance. The battery cover 30 presents a forwardly and downwardly inclined surface 30a at its front end which provides a rest for the golf bag near its lower end. In back of the rear wheels 24, 25, the base 20 of the cart presents an upwardly and forwardly inclined extension 72, against which the bottom of the golf bag rests, and an arcuate cradle 73 (FIG. 2) immediately behind the extension 72.

A battery-operated motor 31 (FIG. 4) is located below the bell-shaped front housing 27 and above the front axle 23 midway between the motor-driven front wheels 21 and 22. As shown in FIG. 5, the motor 31 has a drive shaft 32 at its lower end carrying a worm gear 33 which meshes with a larger diameter pinion gear 34 affixed to the front axle 23.

The motor 31 rests on a horizontal platform 35 which is welded or otherwise rigidly attached to the lower end of a rotatable vertical post 36. Immediately above the motor-supporting platform 35, the shaft 36 extends through a flanged sleeve bearing 37 located inside an inverted, flanged, annular housing 38, which has a central opening 39 through which the post 36 extends. The bearing housing 38 is carried by a rigid internal structural part 40 in the base 20. A flanged housing 41 is bolted to the bottom of the motor platform 35 around the latter's periphery to enclose the worm gear 33, the pinion 34 and the lower end of the rotatable post 36. This housing carries a pair of flanged sleeve bearings 75 and 74 (FIG. 4) which rotatably support the front axle 23 on opposite sides of the pinion gear 34.

Figure 4:
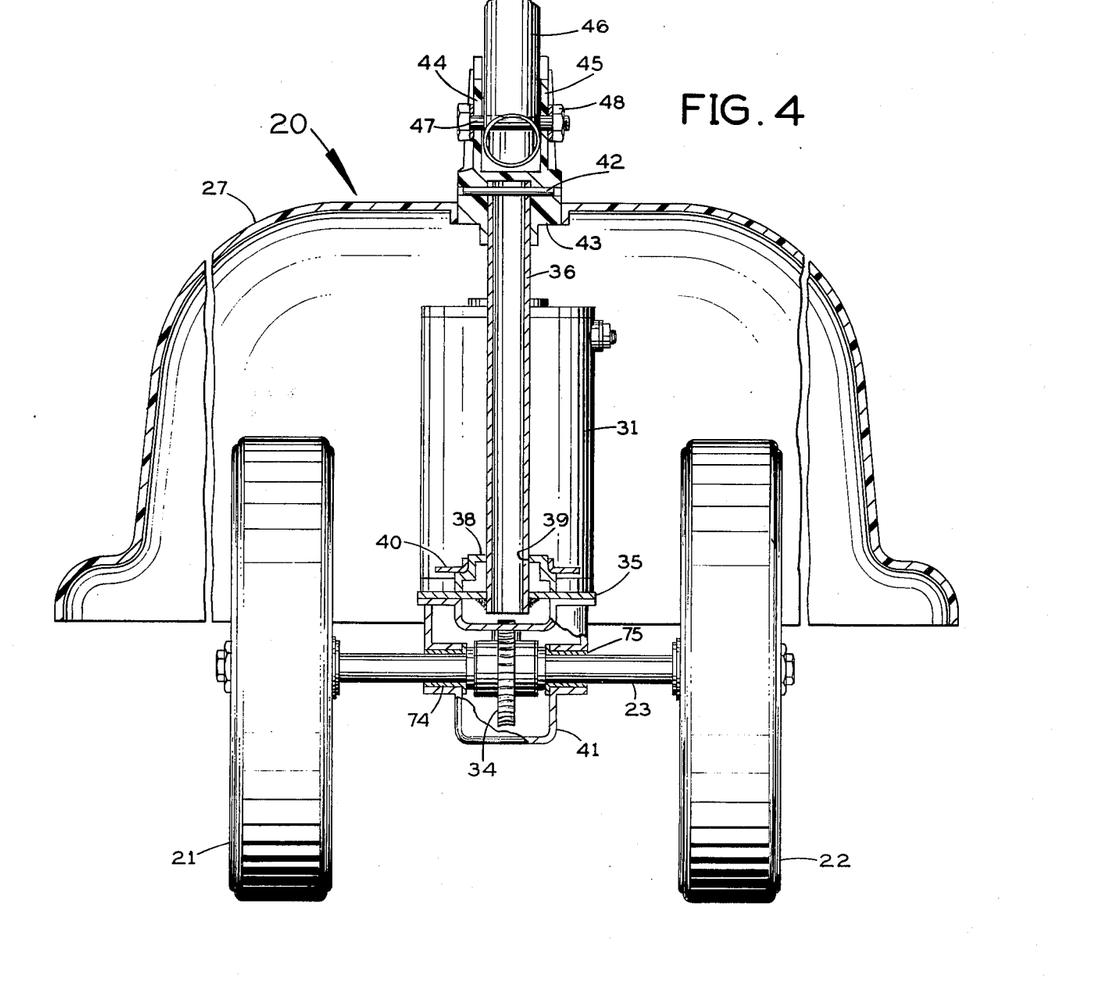
FIG. 4 is a vertical cross-section through the base of the cart at its motor-driven front wheels, taken along the line 4—4 in FIG. 1.

The upper end of the post 36 is attached rigidly by a cross pin 42 to a fitting 43 which is rotatably seated in the top of the rear housing 27. As best seen in FIG. 4, the fitting 43 has a pair of spaced upstanding ears 44 and 45 which snugly receives between them the lower end of the handle 46 of the cart. This handle is pivotally coupled to these ears by a cross bolt 47 carrying a nut 48 on one end. The fitting 43 presents an upstanding front wall 49 (FIG. 5) behind its ears 44, 45 and this wall presents an upwardly and forwardly inclined inside face 50 which is engageable by the front of the handle 46 to provide a rest or downward limit stop for the handle.

With this arrangement the handle 46 may be pivoted about the cross bolt 47 in a vertical plane between the lowered position (FIG. 5), in which its lower end rests on the inclined face 50 of fitting 43, and any selected raised position, in which its lower end is raised away from this face. Also, whenever the handle 46 is displaced laterally to one side or the other, such displacement is imparted to the rotatable fitting 43, which rotates in the top of the front wheel housing 27 and imparts the same rotation to the vertical post 36. In turn, the post causes the motor platform 35 to be turned about the vertical axis of the post. This movement is imparted through the motor shaft 32, worm gear 33 and pinion gear 34 to the front axle 23 so as to turn the front axle in the same direction (and through the same angular extent about the axis of the vertical post 36) as the handle 46 is displaced laterally.

The motor 31 is connected electrically across the battery 29 in series with a rheostat which, in accordance with an important aspect of this invention, is located at the upper end of the handle 46 and is operable by a squeeze grip there through a mechanical linkage having substantially no lost motion.

As shown in FIG. 5, the front wheel housing 27 supports a manually separable plug-and-socket connector 51 having its socket connected through electrical wiring 52 and 53 to the battery and the motor. The plug is connected through a two-wire, flexible, sheathed electrical cable 54 which extends through an opening 46a formed in the handle near its lower end and passes up along the interior of the handle to its upper end.

Figures 6, 7:
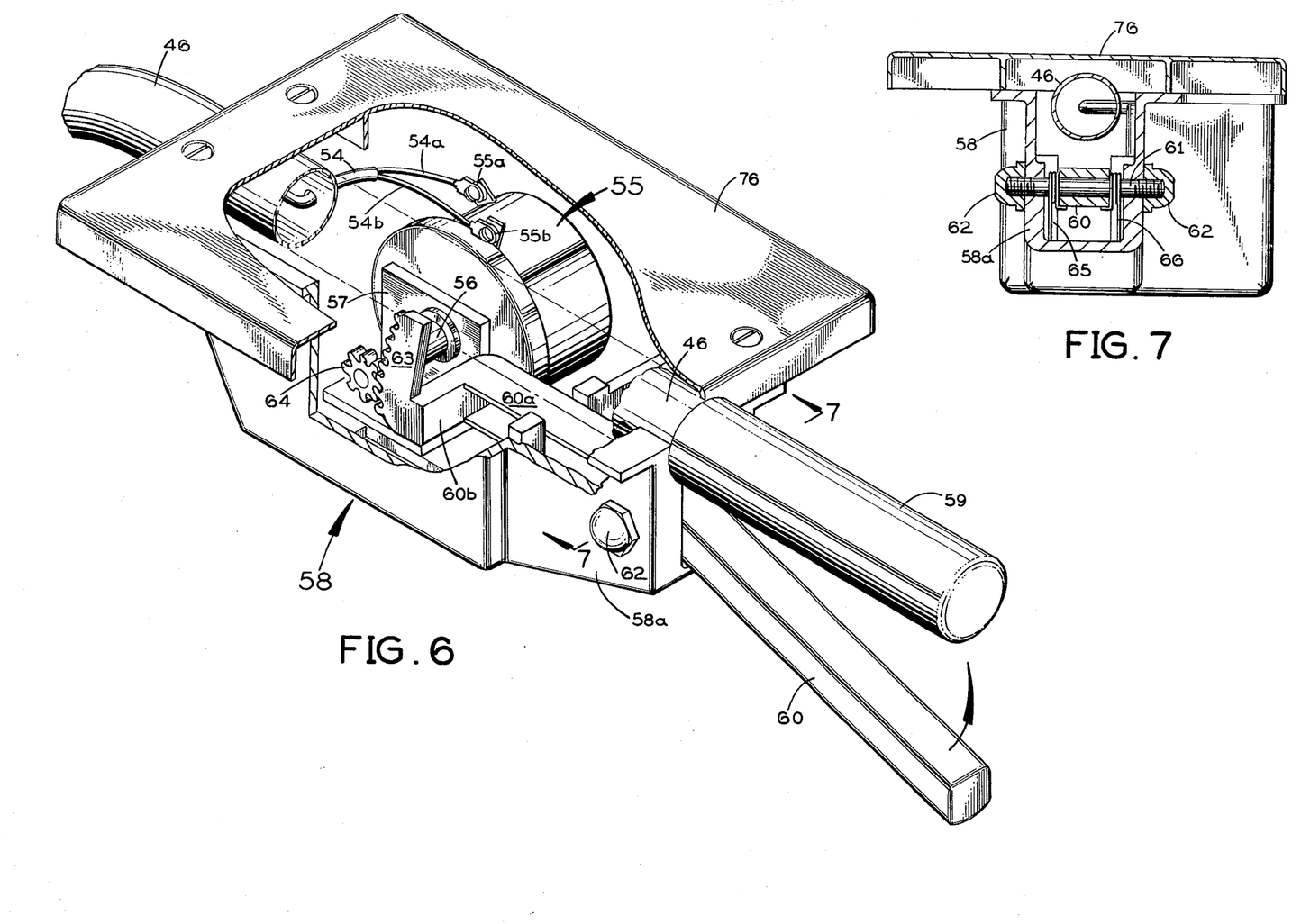
FIG. 6 is a fragmentary perspective view, with parts broken away for clarity, showing the squeeze grip-operated rheostat on the upper end of the handle for the cart.
FIG. 7 is a vertical cross-section taken along the line 7—7 in FIG. 6.

As best seen in FIG. 6, at the upper end of the handle 46 the two wires 54a and 54b of this electrical cable are connected respectively to the terminals 55a and 55b of a rheostat 55 of conventional design. The rheostat has an adjustable contact (not shown) which is mounted on a rotatable input shaft 56, so that the angular rotational position of this shaft determines the amount of electrical resistance that the rheostat provides in the energization circuit for motor 31. Therefore, the rotational position of the rheostat shaft 56 determines the speed of motor 31.

The rheostat housing is carried by a rigid L-shaped bracket 57, which is mounted on a housing 58 attached to the upper end of the handle 46. The support bracket 57 is mounted on the bottom wall of this housing at the inside of the housing 58 and it rigidly supports the rheostat 55 at a fixed position inside this housing.

Figure 1:
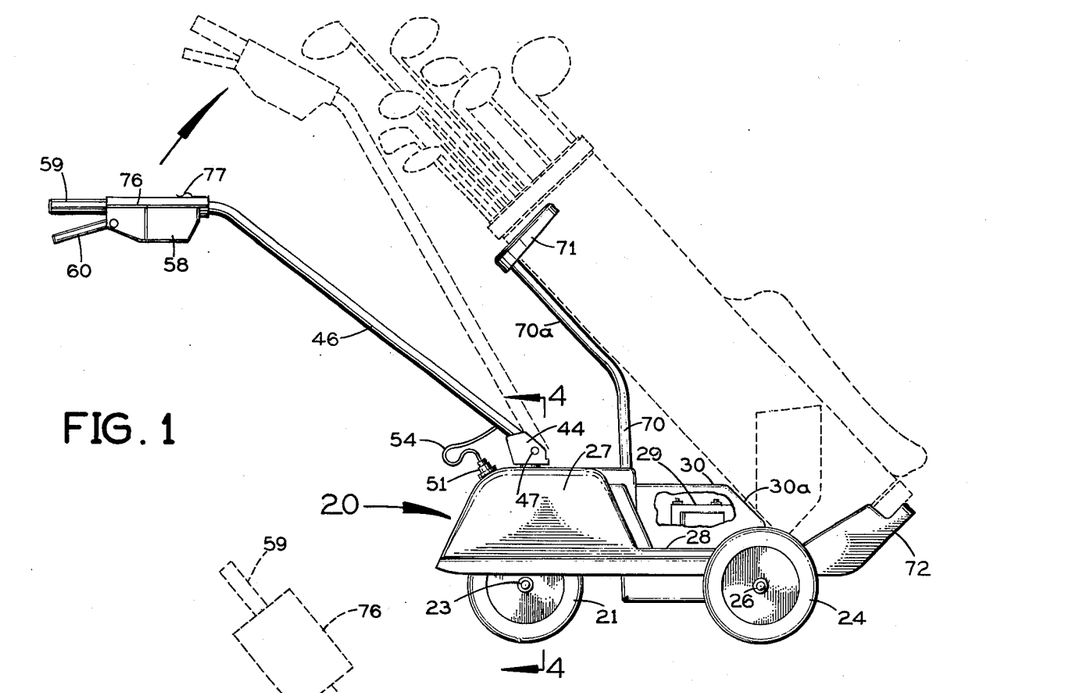
FIG. 1 is a side elevational view of a first embodiment of the present golf bag cart, showing the golf bag in phantom lines and showing the cart handle in phantom lines in a raised position as well as in full lines in a lower position.
Figure 2:
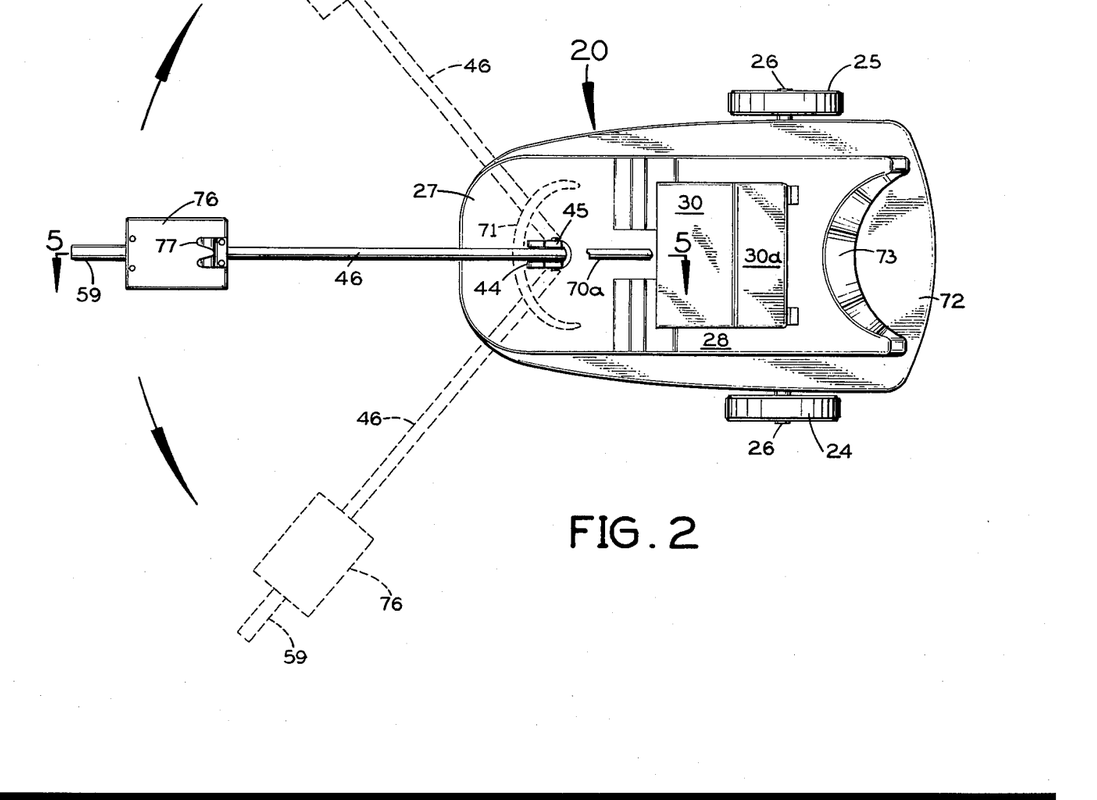
FIG. 2 is a top plan view of the FIG. 1 cart, with the handle in full lines in a centered position and in phantom lines in offset positions on either side.
Figure 3:
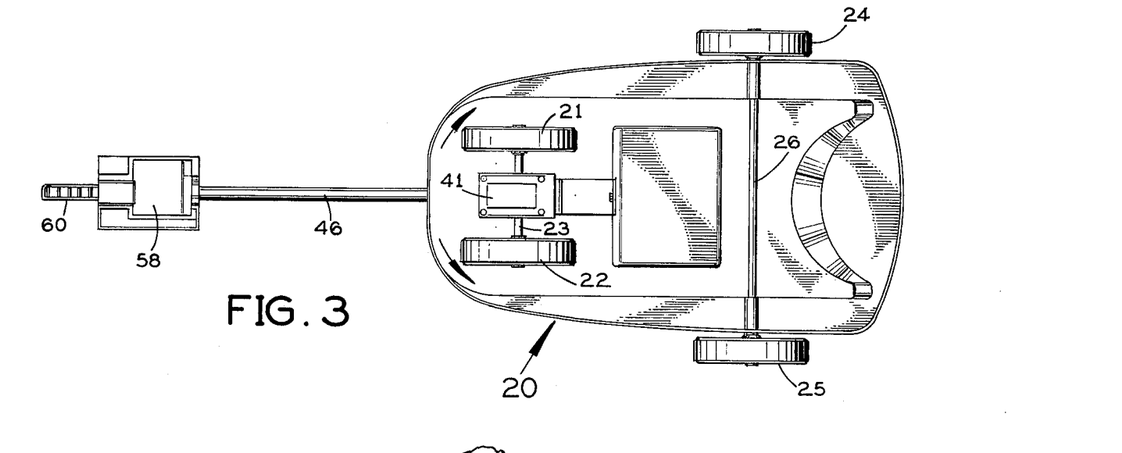
FIG. 3 is a bottom plan view of the FIG. 1 cart.

As indicated in phantom lines in FIG. 6, the upper end of the handle 46 passes through the inside of the housing 58 from end to end, crossing over the top of the input shaft 56 for the rheostat and spaced a short distance above that shaft. A sleeve 59 of rubber, vinyl, leather or other suitable material encloses the outer end of handle 46, which is horizontal when the handle is in its normal, lowered position, as shown in FIGS. 1 and 5.

A lever 60 extends below the sleeved outer end of shaft 46 and is pivotally adjustable toward and away from it in vertical alignment. For this purpose, the lever 60 is pivotally mounted on a cross pin 61 (FIG. 7) carried by the reduced, bifurcated outer end 58a of the housing. Cover caps 62 hold the cross pin 61 in place.

Inside the housing 58, on the opposite side of its pivot pin 61, the lever 60 has an inner end segment or extension 60a (FIG. 5) which is slightly offset angularly from remainder of the lever. As shown in FIG. 6, this inner end segment 60a of the lever is joined to a transverse arm 60b, which projects horizontally away from the rheostat 55 and carries an arcuate gear-toothed rack 63 on its outer end, which is located on the opposite side of the upper end of handle 60 from the rheostat 55. This rack meshes with a pinion gear 64 on the outer end of the rheostat input shaft 56.

The hand lever 60 is biased downward away from the outer end of handle 46 by a pair of torsion springs 65 and 66 (FIG. 7), which are located inside the housing 58. As shown in FIG. 5, one end of the torsion spring 65 engages beneath the inner end segment 60a of the lever at one side of the pivot 61, and the opposite end of this spring is seated against the inside of the housing 58 at its outer end. The other torsion spring 66 is similarly engaged at the opposite side of the lever.

The pivoted lever 60 and the outer end of handle 46 together constitute a squeeze grip which the user may conveniently grasp in his hand and use to regulate the speed of the cart by squeezing more whenever he wants to increase the motor speed. The rack and gear coupling 63, 64, which acts between this squeeze grip and the speed control rheostat 55, has substantially no lost motion, so that the rheostat will correspond immediately and exactly to the pivotal position of the lever 60 in the squeeze grip.

OPERATION

In the operation of this apparatus, when the user grasps the squeeze grip 60, 59 with an easy or relatively relaxed grip, the rack and gear coupling 63, 64 operated by this squeeze grip will position the rheostat shaft 56 at a setting such that the motor 31 will drive the front wheels at the desired speed. The user may want to increase the motor speed when the load on it is increased, such as when the cart is travelling uphill, or he may want to decrease the motor speed when the cart is going downhill. Any such speed adjustment is accomplished simply by increasing or decreasing the manual squeeze that is applied to the squeeze grip 60, 59. This is done naturally or reflexively by the user, who tends naturally to squeeze his hand more when walking uphill and to relax it more when walking downhill.

The user also may steer the golf cart to the left or right through the handle 46, as already described in detail. The pivot at 47 enables the cart to move freely up and down over rough terrain without changing the position of the user's hand on the upper end of the handle.

The housing 58 which contains the rheostat 55 and the rear-and-gear linkage 63, 64 has a flat top cover 76 (FIG. 6), which carries a spring clip 77 (FIGS. 1 and 2) for holding the golfer's score card flat against the top of this cover.

EMBODIMENT OF FIGS. 8–11

FIGS. 8–11 show a second embodiment of this invention which in most respects is essentially similar to the embodiment of FIGS. 1–7 and for that reason need not be described in detail as to the corresponding parts. The elements in FIGS. 8–11 which correspond to those in FIGS. 1–7 are given the same reference numerals plus 100.

Figures 8, 9:
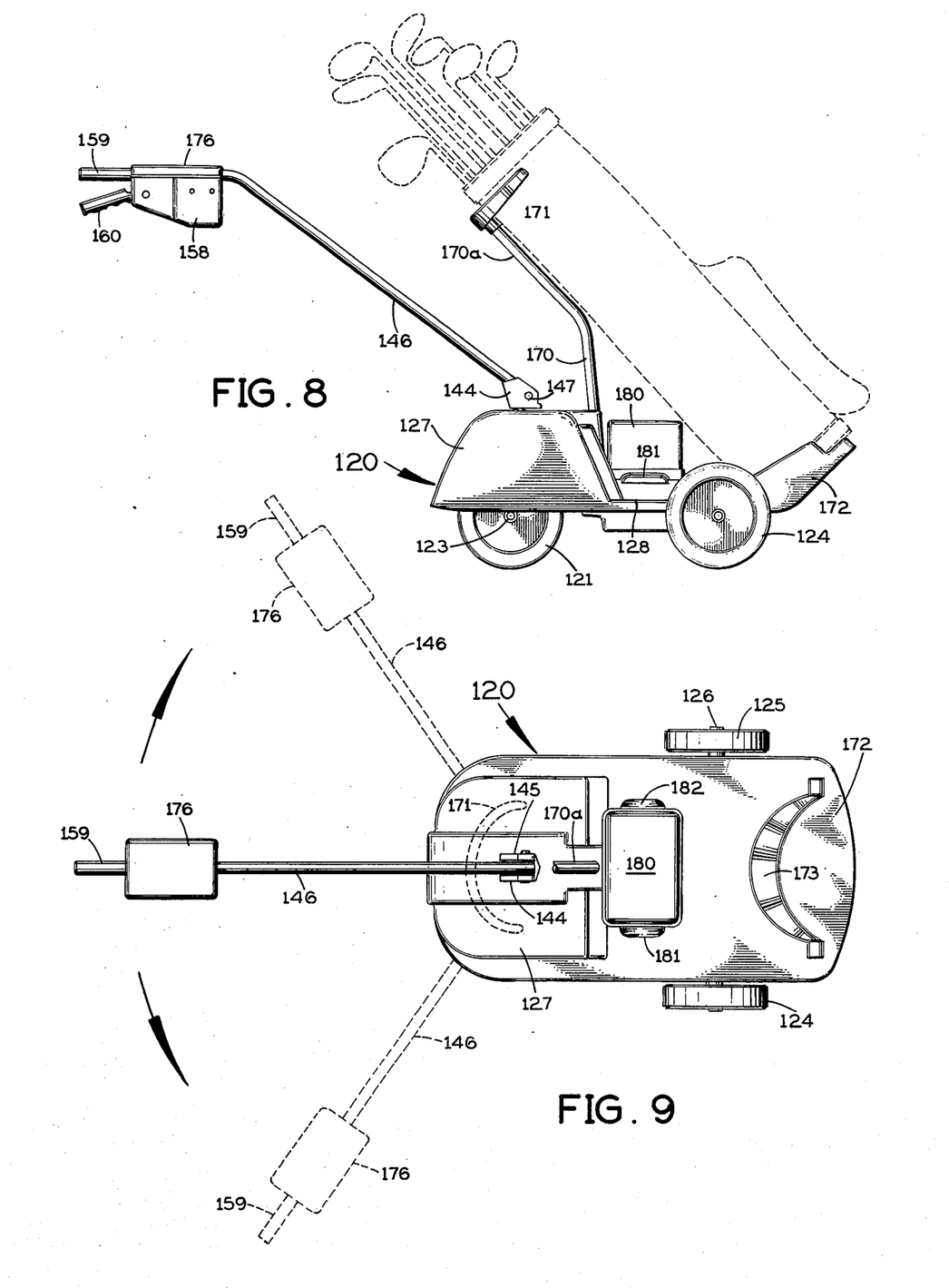
FIG. 8 is a side elevational view showing a second embodiment of the present golf bag cart with the golf bag shown in phantom lines on the cart.
FIG. 9 is a top plan view of the FIG. 8 cart.
Figure 10:
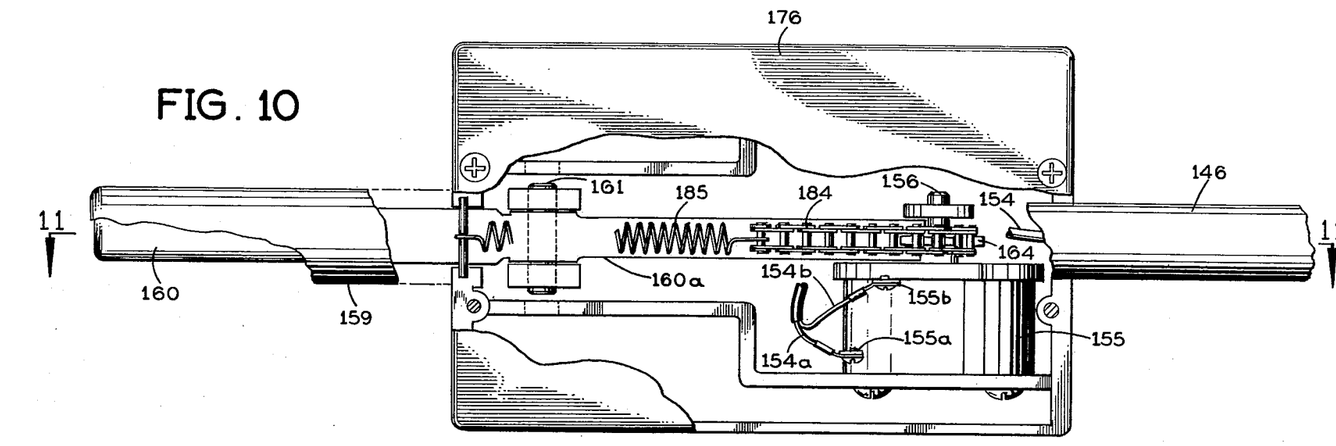
FIG. 10 is a fragmentary top plan view, with parts broken away for clarity, showing the squeeze grip-operated rheostat on the upper end of the handle for the FIG. 8 cart.

In this second embodiment the battery is in a separate battery case 180 with handles 181, 182 at its opposite ends. This battery case seats on the base 120 of the cart and may be removed readily for separate handling, as in the case of a golfer who carries the cart in the trunk of his car, in which event the combined weight of the battery and the rest of the cart might make them awkward or too heavy to handle as a unit.

As the upper end of the handle 146, the mechanical coupling between the squeeze grip 159, 160 and the rheostat 155 includes a spring-tensioned chain 184 (FIG. 11), which meshes with the sprocket 164 on the outer end of the rheostat shaft 156. At its lower end, the chain is pivotally connected to the inner end extension 160a of lever 160. The chain extends through a quarter turn across the top of the sprocket 164 and its opposite end is connected to one end of a tension spring 185. The opposite end of this spring is attached to the back end of the housing 158.

Figure 11:
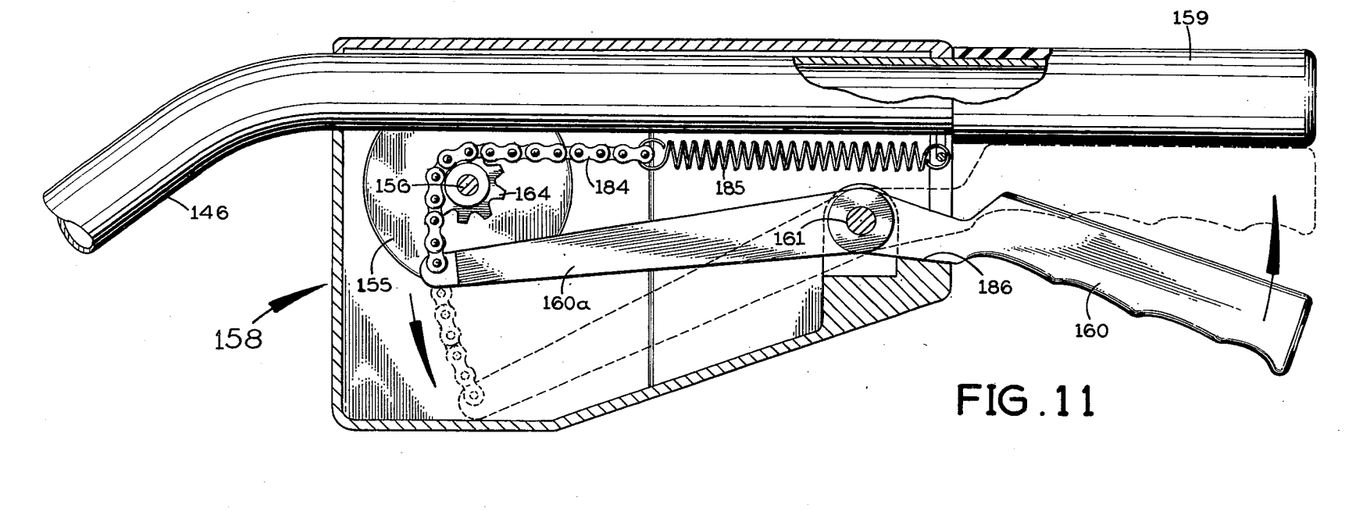
FIG. 11 is a vertical longitudinal section taken along the line 11—11 in FIG. 10.

Normally, the spring 185 exerts sufficient tension on the chain to position the parts as shown in FIG. 11, with the inner end 160a of the pivoted lever pulled up and its manually engageable outer end extending down away from the back end of handle 146. The housing 158 at its back end presents an upwardly facing surface 186 which is engageable by the bottom of lever 160 to limit the extent to which the latter is biased downwardly by the spring 185.

When the user squeezes the squeeze grip 159, 160, the outer end of lever 160 may pivot upward as far as the phantom line position in FIG. 11, or to an immediate position between the full line and phantom line positions in this FIG. Such pivotal movement of the lever will pull the chain 184 down and impart a corresponding angular rotation to the sprocket 164, thereby changing the rheostat setting in accordance with the pivotal position of the lever 20.

It will be apparent that the spring 185 maintains the chain 184 under sufficient tension that there will be substantially no lost motion between the pivoted lever 160 and the rheostat shaft 156.

I claim:
1. In a motor-driven golf bag cart having:
   a gold bag support mounted on ground-engaging wheels;
   a battery-operated motor on said support in driving relationship with one or more of said wheels;
   and a steering handle extending up from said golf bag support to be manipulated by the user for steering the cart;
the improvement which comprises the combination of:
   a rheostat connected electrically to said motor to control its speed, said rheostat being mounted on the handle at its upper end;
   a squeeze grip at the upper end of said steering handle, said squeeze grip comprising an integral hand grip segment on the upper end of said handle and a lever pivoted on said handle and extending in confronting relationship to said integral hand grip segment for pivotal adjustment toward or away from the latter;
   and mechanical coupling means acting between said squeeze grip and said rheostat to adjust the rheostat from the squeeze grip substantially without lost motion to set the motor speed in accordance with the manual squeeze exerted on the squeeze grip by the user;
   said rheostat having a rotatable shaft which controls the rheostat setting in accordance with its rotational position;
   and said mechanical coupling means comprising an arcuate toothed rack connected rigidly to said lever for pivotal movement in unison therewith and a pinion meshing with said rack and connected rigidly to said shaft of the rheostat.
2. A golf bag cart according to claim 1, wherein said handle has a longitudinal passageway extending from said rheostat down to its lower end, and further comprising electrical wiring extending from the rheostat down through said passageway in the handle for connection to said motor.
3. In a motor-driven golf bag cart having:
   a golf bag support mounted on ground-engaging wheels;

a battery-operated motor on said support in driving relationship with one or more of said wheels;

and a steering handle extending up from said golf bag support to be manipulated by the user for steering the cart;

the improvement which comprises the combination of:

a rheostat connected electrically to said motor to control its speed, said rheostat being mounted on the handle at its upper end;

a squeeze grip at the upper end of said steering handle, said squeeze grip comprising an integral hand grip segment on the upper end of said handle and a lever pivoted on said handle and extending in confronting relationship to said integral hand grip segment for pivotal adjustment toward or away from the latter;

and mechanical coupling means acting between said squeeze grip and said rheostat to adjust the rheostat from the squeeze grip substantially without lost motion to set the motor speed in accordance with the manual squeeze exerted on the squeeze grip by the user;

said rheostat having a rotatable shaft which controls the rheostat setting in accordance with its rotational position;

and said mechanical coupling means comprising a pinion connected rigidly to said shaft of the rheostat and a spring-tensioned chain meshing with said pinion and operatively coupled to said lever to be pulled when said lever is pivoted toward said integral hand grip segment on the handle.

4. In a motor-driven golf bag cart having:

a golf bag support mounted on ground-engaging wheels;

a battery-operated motor on said support in driving relationship with one or more of said wheels;

and a steering handle extending up from said golf bag support to be manipulated by the user for steering the cart;

the improvement which comprises the combination of:

a rheostat connected electrically to said motor to control its speed, said rheostat being mounted on the handle at its upper end;

a squeeze grip at the upper end of said steering handle, said squeeze grip comprising an integral hand grip segment on the upper end of said handle and a lever pivoted on said handle and extending in confronting relationship to said integral hand grip segment for pivotal adjustment toward or away from the latter;

mechanical coupling means acting between said squeeze grip and said rheostat to adjust the rheostat from the squeeze grip substantially without lost motion to set the motor speed in accordance with the manual squeeze exerted on the squeeze grip by the user;

and a housing enclosing said rheostat and said mechanical coupling means, said housing being mounted on the upper end of said handle immediately to the rear of said squeeze grip.

5. A golf bag cart according to claim 4, wherein:

said rheostat has a rotatable shaft which controls the rheostat setting in accordance with its rotational position;

and said mechanical coupling means comprises an arcuate toothed rack connected rigidly to said lever for pivotal movement in unison therewith, and a pinion meshing with said rack and connected rigidly to said shaft of the rheostat.

6. A golf bag cart according to claim 4, wherein:

said rheostat has a rotatable shaft which controls the rheostat setting in accordance with its rotational position;

and said mechanical coupling means comprises a pinion connected rigidly to said shaft of the rheostat and a tensioned chain meshing with said pinion and operatively coupled to said lever to be pulled by the latter when said lever is pivoted toward said integral hand grip segment on the handle.

7. In a motor-driven golf bag cart having:

a golf bag support mounted on ground-engaging wheels;

a battery-operated motor on said support in driving relationship with one or more of said wheels;

a steering handle extending up from said golf bag support to be manipulated by the user for steering the cart, said steering handle having a squeeze grip at its upper end;

a rheostat connected electrically to said motor to control its speed, said rheostat being mounted on the handle at its upper end and operable by said squeeze grip to set the motor speed in accordance with the manual squeeze exerted on the squeeze grip by the user;

said golf bag support including a base located just above said wheels;

said wheels including a pair of front wheels mounted on an axle and located respectively at opposite sides of the base;

and said handle being pivotally adjustable laterally with respect to the base; the improvement which comprises:

a vertical post extending down from the top of the base between said front wheels and supported for rotation about its vertical axis;

a platform rigidly attached to said post below the top of the base and supporting said motor from below;

a gear reduction engaged between said motor and the front wheel axle for driving the latter at reduced speed from the motor;

means acting between said post and said axle for turning said axle angularly about the axis of said post when the latter is turned and said platform turns with the post;

and means coupling the lower end of said handle to the upper end of said post to convert lateral pivotal adjustment of the handle into corresponding rotation of said post.

8. A golf bag cart according to claim 7, wherein said means coupling the handle to the post is a fitting fastened to the upper end of said post and rotatably seated on the top of the base to provide a bearing support for the post.

9. A golf bag cart according to claim 8, and further comprising a lower bearing for the post just above said platform.

10. A golf bag cart according to claim 8, and further comprising means providing a horizontal pivot between said fitting and the lower end of said handle to enable pivotal adjustment of the handle vertically as well as laterally.

11. A golf bag cart according to claim 10, and further comprising a lower bearing located just above said platform and rotatably receiving the lower end of said post.

* * * * *